(12) United States Patent
Welker et al.

(10) Patent No.: US 7,156,123 B2
(45) Date of Patent: Jan. 2, 2007

(54) PRESSURE REDUCTION SYSTEM FOR QUICK-CONNECTS

(75) Inventors: Brian H. Welker, Sugar Land, TX (US); Tracy Dean Peebles, Houston, TX (US)

(73) Assignee: Welker Engineering Company, Sugar Land, TX (US)

( * ) Notice: Subject to any disclaimer, the term of this patent is extended or adjusted under 35 U.S.C. 154(b) by 64 days.

(21) Appl. No.: 10/907,364

(22) Filed: Mar. 30, 2005

(65) Prior Publication Data
US 2006/0219309 A1 Oct. 5, 2006

(51) Int. Cl.
*F16K 11/04* (2006.01)
(52) U.S. Cl. .................... 137/886; 73/863.86
(58) Field of Classification Search ................ 137/886; 73/863.86
See application file for complete search history.

(56) References Cited

U.S. PATENT DOCUMENTS

| 3,643,694 A | * | 2/1972 | Duke et al. ................. 137/883 |
| 4,616,677 A | * | 10/1986 | Krechel et al. ............. 137/881 |
| 5,127,437 A | * | 7/1992 | Ross, II ................. 137/614.18 |
| 5,452,746 A | * | 9/1995 | Hoobyar et al. ............ 137/886 |
| 6,068,017 A | * | 5/2000 | Haworth et al. ............ 137/271 |
| 6,148,841 A | * | 11/2000 | Davidson ................. 137/68.23 |

\* cited by examiner

*Primary Examiner*—John Fox
(74) *Attorney, Agent, or Firm*—Blackwell Sanders Peper Martin LLP; Lawrence E. Evans

(57) ABSTRACT

When sample collection cylinders get full, they need to be switched out with empty sample collection cylinders. The connection between the sample cylinder and a piping system is often a quick-connect which typically has a high pressure rating when closed and a lower pressure rating when opened. The bleeder valve of the present invention, when installed in the piping system between the quick-connect and the sample cylinder can be used to reduce the pressure in the system and the quick-connect to rated pressures before the quick-connect is opened. In an alternative embodiment intended for service with hazardous materials, the bleeder valve and seals are formed from resistant materials and the vent is connected to a flare or other suitable point of disposal.

6 Claims, 6 Drawing Sheets

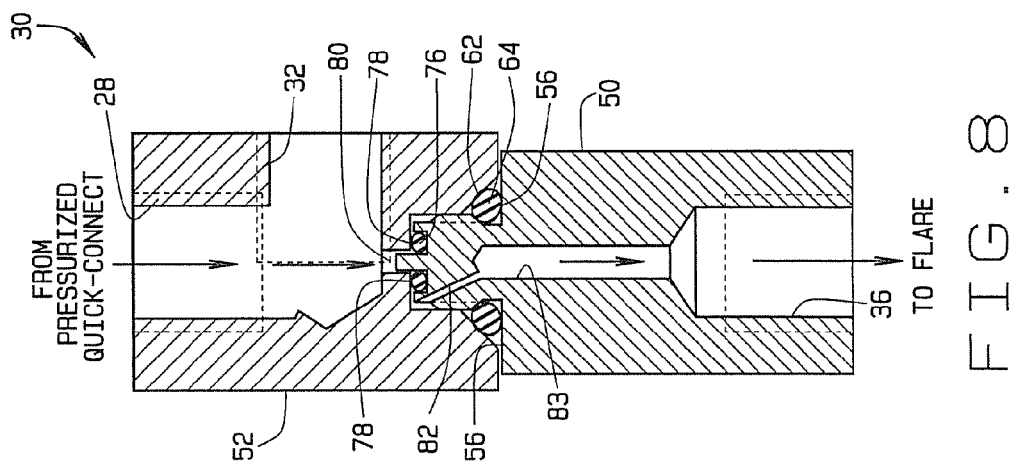
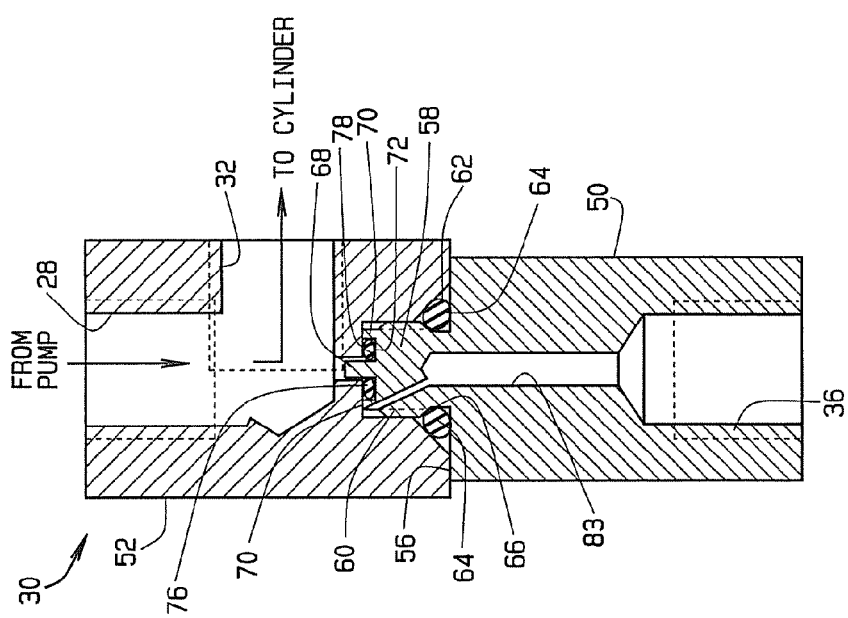

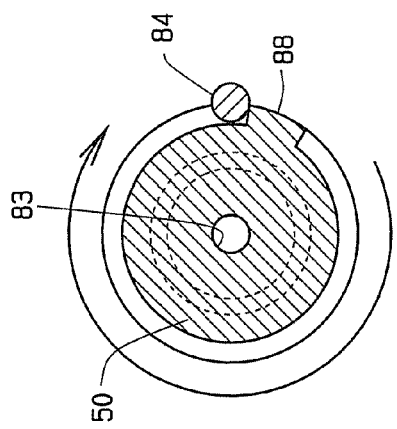
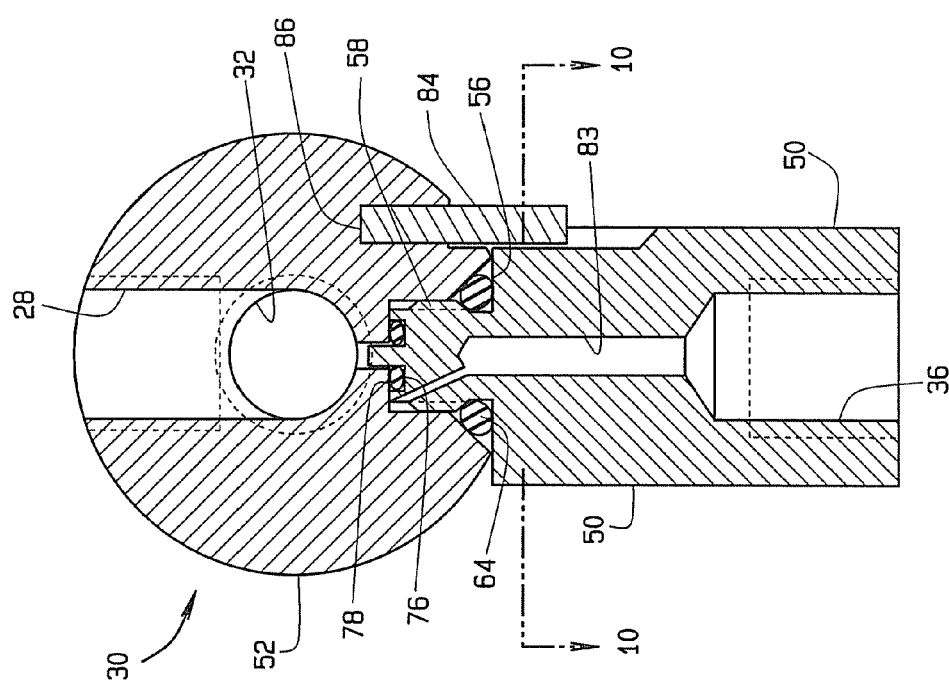

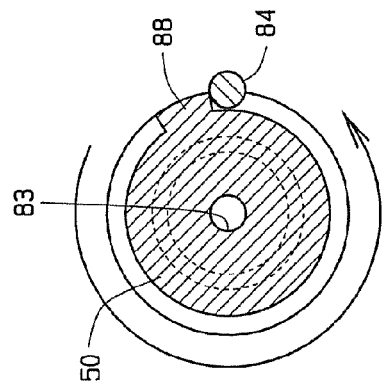
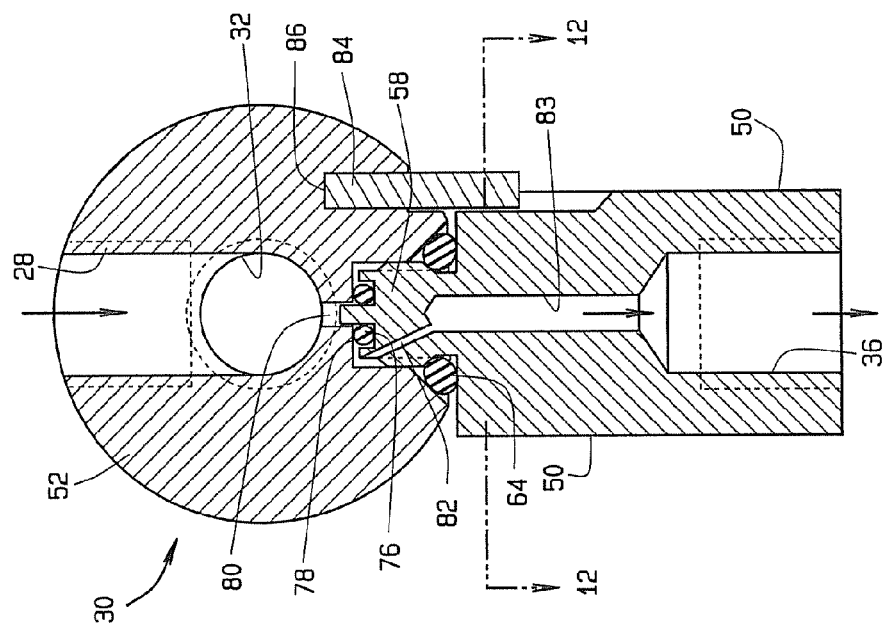

PRESSURE REDUCTION SYSTEM FOR QUICK-CONNECTS

BACKGROUND OF INVENTION

It is common to take small samples from a product flowing through a pipeline and to accumulate the individual samples, over time, in a sample cylinder. The samples are typically pumped into the sample cylinder under pressure at a sample station. When the sample cylinder is full or nearly full of the samples, the cylinder is typically removed from the pump and associated piping at the sample station and taken to a laboratory for analysis of the collective sample. In many cases, the sample station is located in a rural area and the laboratory is located in a city. It therefore becomes important for operators to be able to quickly change out a full sample cylinder with an empty sample cylinder as the operator goes from sample station to sample station.

It has therefore become common for sample cylinders to be connected to the piping system at a sample station with a flexible line and a quick-connect. When the sample cylinder is full, the samples are under pressure that may range widely from about 5 psi to about 5,000 psi. The quick-connect that is connected to the sample cylinder will be rated for the maximum pressure experienced by the piping system and the cylinder; however, when disconnected, the pressure rating for many quick-connects is substantially less than the connected rating. There is a need for an inexpensive bleeder valve in the piping system to depressurize the fluid in the quick-connect between the sample cylinder shut-off valve and the shut-off valve in the piping system before the quick-connect is disconnected to switch out the full sample cylinder with an empty sample cylinder. Such an inexpensive bleeder valve could be opened to release the pressure in the quick-connect to a level at or below the rated pressure of the quick-connect in the disconnected mode.

In some applications, the sample may contain hazardous fluids like hydrogen sulfide or chlorine. If some of the hazardous pressurized fluid is vented in the proximity of the operator, it could be hazardous to their health. In these situations, there is a need for an inexpensive bleeder valve that is also resistant to the hazardous materials to release the pressure and direct the vented fluid to a flare or other disposal location. For example, if natural gas is the process fluid that is being sampled, and there is some hydrogen sulfide in the gas, the inexpensive bleeder valve and the seals need to be made from a material that resists the corrosion and other deleterious effects of the hydrogen sulfide.

SUMMARY OF INVENTION

An inexpensive bleeder valve can be positioned in the piping system of a sample station to bleed down the fluid pressure in a quick-connect and related piping prior to removal of the full sample cylinder and replacement with an empty sample cylinder. The present invention is less expensive than conventional two-way ball valves because it requires less machining and conventional o-rings can be used to form the seals. The present invention is also less expensive than an arrangement of a single ported valve and a street T-fitting to accomplish the same purpose. With the reduction in the number of fittings, there is less chance for leakage and less time in assembly of the system. When the valve element of the present invention is rotated, a small o-ring lifts from the valve seat and a larger o-ring remains in compression to make a seal between the valve element and the valve body. The pressurized fluid passes across the small o-ring and is vented to atmosphere or some other point of disposal. This design uses readily available steels such as 316 stainless steel and comparatively inexpensive o-rings such as those formed from Buna-n polymer.

In harsh environments with hazardous materials, this bleeder valve can be formed from materials that are resistive to such hazardous materials and the present invention is still comparatively less expensive than two-way ball valves rated for similar service. For example, if the fluid being sampled contains hydrogen sulfide, which is toxic in small quantities to humans and is corrosive to common metals and polymers, the bleeder valve can be formed from Inconel® steel with Kalrez® o-rings. When the pressurized fluids are bled from the quick-connect and related piping, it must be directed from the bleeder valve to a flare or other suitable point of disposal.

BRIEF DESCRIPTION OF DRAWINGS

FIG. 7 is a section view of the bleeder valve of FIG. 5 in the closed position with flow arrows to indicate fluid flow from the pump to the sample cylinder. Note both the large and the small o-rings are compressed in the bleeder valve.

FIG. 8 is a section view of the bleeder valve of FIG. 6 in the open position with flow arrows to indicate fluid flow from the pressurized quick-connect and related piping to the flare. Note the small o-ring is relaxed and the large o-ring is still compressed in the bleeder valve.

FIG. 9 is a section view of the bleeder valve taken 90 degrees from the angle of FIG. 7. In FIG. 7, the bleeder valve is in the closed position.

FIG. 10 is a section view along the line 10—10 of FIG. 9.

FIG. 11 is a section view of the bleeder valve taken 90 degrees from the angle of FIG. 8. In FIG. 11, the bleeder valve is in the open position.

FIG. 12 is a section view along the line 12—12 of FIG. 11.

DESCRIPTION OF DRAWINGS

Figure 1:
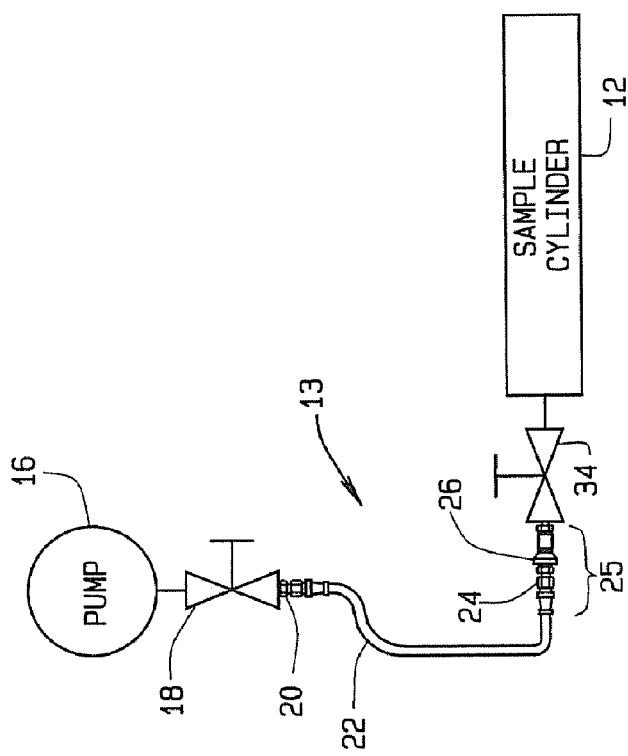
FIG. 1 is a schematic of a sample cylinder connected to a portion of the prior art piping system at a sample station.

FIG. 1 is a schematic of a sample collection cylinder 12 connected to a portion of the prior art piping system 13 at a sample station, not shown. A pump 16 is connected to a shut off valve 18. A connector 20 connects the pump 16 with a flexible hose 22. The plug portion 24 of a quick-connect 25 is connected to the opposite end of the flexible hose 22. The receptacle portion 26 of the quick-connect 25 connects to a shut-off valve 34 which connects to the sample collection cylinder 12.

As is well known to those skilled in the art, the plug portion 24 is sized and adapted to engage the receptacle portion 26 of quick connect 25 as shown in this figure. Pressurized fluid is discharged from the pump through the prior art piping system to the sample collection cylinder, which for the sake of simplicity, will sometimes hereinafter be referred to as a sample cylinder. When the sample cylinder is being filled with individual samples, the shut off valves 18 and 34 are in the open position. When the sample cylinder is full or at least partially full, it will be switched out with an empty cylinder and the full cylinder will be taken to a laboratory for analysis of the accumulated samples which is a procedure well known to those skilled in the art. In order to switch out the full sample cylinder, the shut off valves 18 and 34 are actuated from the open to the closed position which isolates pressurized fluid in the hose 22 and quick-connect 25. When the quick-connect is opened, the pressurized fluid escapes to atmosphere. The problem with this prior art system is that the quick-connect is not rated to be opened under the same pressure as it is rated when it is closed. Thus, the quick-connect may fail when opened under pressure which may cause damage and/or injury.

In situations where a hazardous material is being sampled, the operator is exposed to the hazardous material when the quick-connect is opened. In situations involving natural gas with some hydrogen sulfide, the operator and the environment are exposed to this fluid when the quick-connect is opened.

Figure 2:
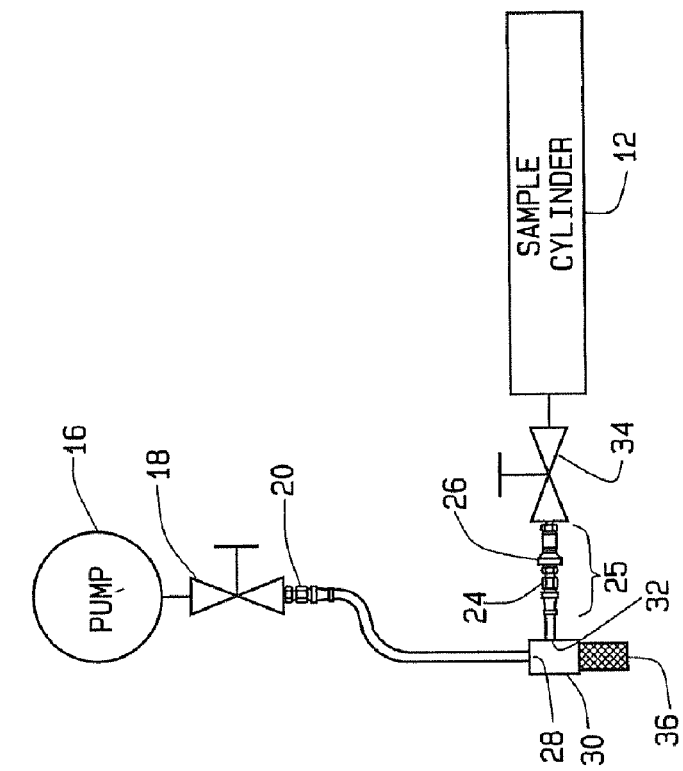
FIG. 2 is a schematic of the sample cylinder connected to a portion having the present invention installed therein. In this first embodiment, a bleeder valve vents to atmosphere.

FIG. 2 is a schematic of the sample cylinder 12 connected to a portion of the piping system having the present invention installed therein. The pump 16 is connected to the shut off valve 18. The connector 20 connects the pump 16 with the flexible hose 22. The hose 22 connects with the inlet 28 of the bleeder valve 30. The plug portion 24 of the quick-connect 25 is connected to the outlet of the bleeder valve 30. The receptacle portion 26 of the quick-connect 25 connects to the shut off valve 34 which connects to the sample cylinder 12. A vent 36 of the bleeder valve 30 allows pressurized fluid to be vented to atmosphere when the bleeder valve 30 is opened. In this first embodiment, no hazardous materials are in the fluid so the bleeder valve 30 may be formed from typical machine steels, such as 316 stainless and the seals may be formed from typical o-ring materials such as Buna-n. Both of these materials, 316 stainless and Buna-n are relatively inexpensive compared to materials such as those that are designed to resist hazardous materials like hydrogen sulfide.

In the embodiment of FIG. 1, the plug portion 24 of the quick connect 25 is connected to the bleeder valve 30. As a matter of convenience, the quick-connect 25 could be reversed and the receptacle portion 26 could be connected to the bleeder valve 30. Those skilled in the art will recognize that the arrangement of any of the quick-connects shown in the following drawings could be reversed, simply as a matter of convenience.

Figure 3:
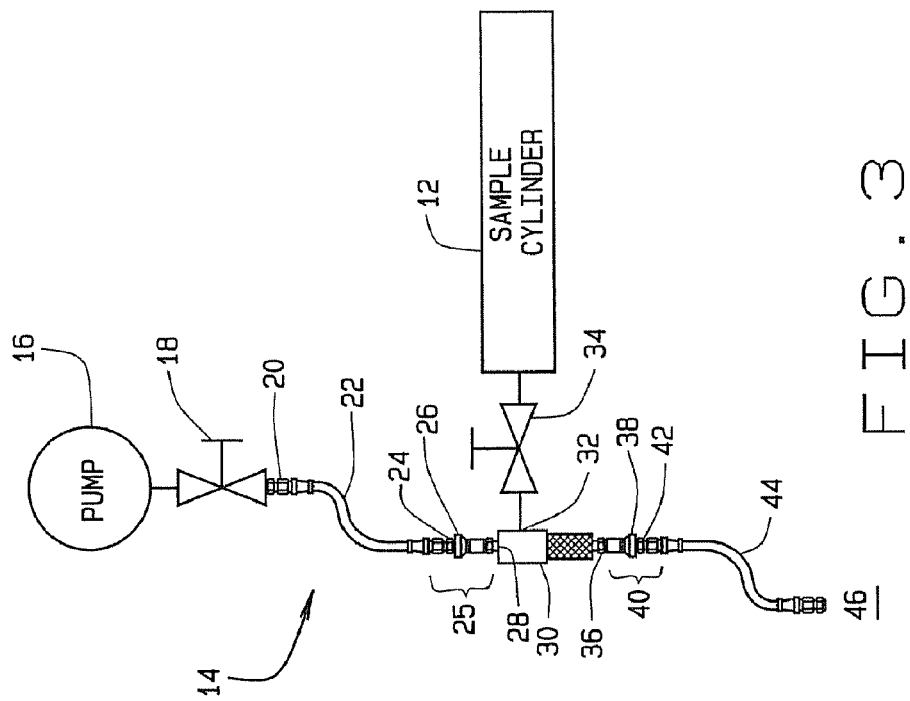
FIG. 3 is a schematic diagram of the sample cylinder connected to a portion of the piping system with an alternative embodiment of the present invention installed therein. All of the following figures show the alternative embodiment of the present invention with a vent to a flare or other suitable point of disposal.

FIG. 3 is a schematic diagram of the sample cylinder 12 connected to a portion of the piping system at a sample station 14. This is an alternative embodiment of the present invention designed to handle hazardous materials, such as hydrogen sulfide and chlorine. In this alternative embodiment, the design of the bleeder valve 30 stays the same, but the materials are upgraded to resist one or more hazardous materials anticipated in the fluid. In addition, the vent from the bleeder valve is piped to a flare or other suitable point of disposal for the hazardous materials.

The pump 16 is connected to the shut off valve 18. The connector 20 connects the pump 16 with the flexible hose 22. The plug portion 24 of the quick-connect 25 is connected to the opposite end of the flexible hose 22. The receptacle portion 26 of the quick-connect 25 connects to the inlet 28 of the bleeder valve 30. The outlet 32 of the bleeder valve 30 connects to the shut off valve 34 which connects to the sample cylinder 12. The vent of the bleeder valve 30 connects to a receptacle portion 38 of a quick-connect 40. A plug portion 42 of the quick-connect 40 connects to a flexible hose 44. The opposite end of the flexible hose 44 connects through piping, not shown, to a flare 46 or other point of disposal. As is well known to those skilled the art, the plug portion 24 is sized and adapted to engage the receptacle portion 26 of quick connect 25; and the plug portion 42 is sized and adapted to engage the receptacle portion 38 of quick-connect 40, as shown in this figure.

Figure 4:
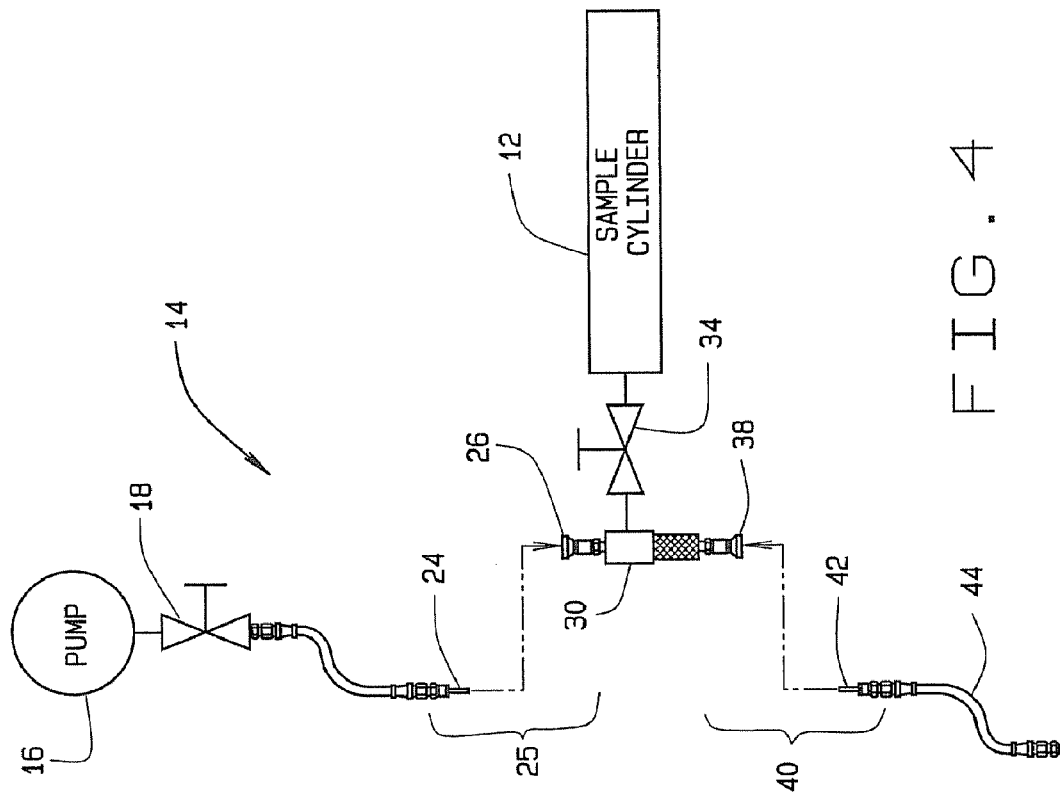
FIG. 4 is a schematic diagram of the sample cylinder of FIG. 3 that has been disconnected from a portion of the piping system of FIG. 3.

FIG. 4 is a schematic diagram of the sample cylinder 12 that has been disconnected from a portion of the piping system 14 of the preceding figure. In order to disconnect the sample cylinder from the piping system 14, the shut off valves 18 and 34 must be actuated to the closed position. The bleeder valve 30 is then opened to release any pressure between the valves 18 and 34. The plug portion 24 of the quick-connect 25 is then disconnected from the receptacle portion 26. Likewise, the plug portion 42 of the quick connect 40 is then disconnected from the receptacle portion 38. When the sample cylinder 12 has been disconnected as shown in FIG. 4, the full or partially full sample cylinder 12 may be transported to a laboratory where the sample may be analyzed. An empty sample cylinder may be reconnected with the piping system 14 by reconnecting the quick-connects 25 and 40 and the bleeder valve 30 must be actuated to the closed position. It is common to thereafter purge a new cylinder 12. After purging, the shut off valves 18 and 34 must be actuated to the open position to direct new samples from the pump into the empty sample cylinder. While samples are being taken, the bleeder valve 30 is in the closed position. Prior to removal of a full cylinder the bleeder valve 30 will be opened to vent pressurized fluid to the flare or other point of disposal. In this fashion, the operator and the environment are not exposed to hazardous fluid.

Figure 5:
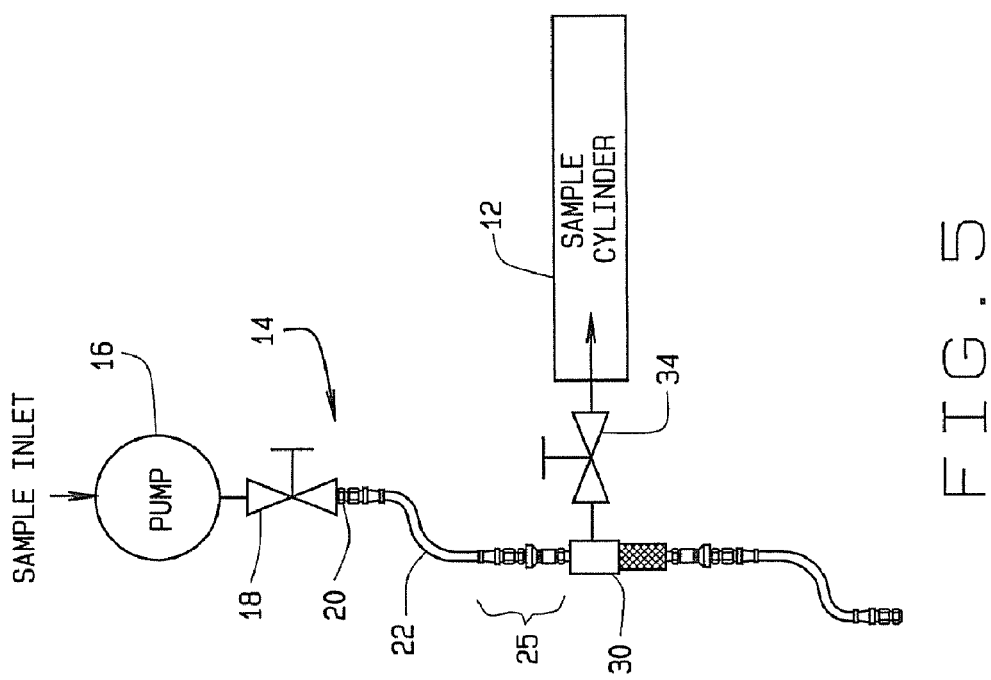
FIG. 5 is a schematic diagram of FIG. 3 with the addition of flow arrows to indicate the flow path of a sample into the sample cylinder. In this Figure, the bleeder valve is in the closed position.

FIG. 5 is the schematic diagram of FIG. 3 with the addition of flow arrows to indicate the flow path of a sample into the sample cylinder 12. In this Figure, the bleeder valve 30 is in the closed position. A sample is taken from a pipeline, not shown, by the pump 16. The sample passes from the pump 16 through the shut off valve 18, the flexible hose 22, the quick-connect 25, the bleeder valve 30 and the shut off valve 34 to the sample cylinder 12. In this figure, the bleeder valve is in the closed position preventing the sample from going to a flare. A two-way ball valve would have the same function as the bleeder valve 30 in this situation, but the ball valve would be much more expensive. Another conventional alternative is a street T-fitting and a single ported valve which is more expensive and creates more joints to leak and possibly fail.

Figure 6:
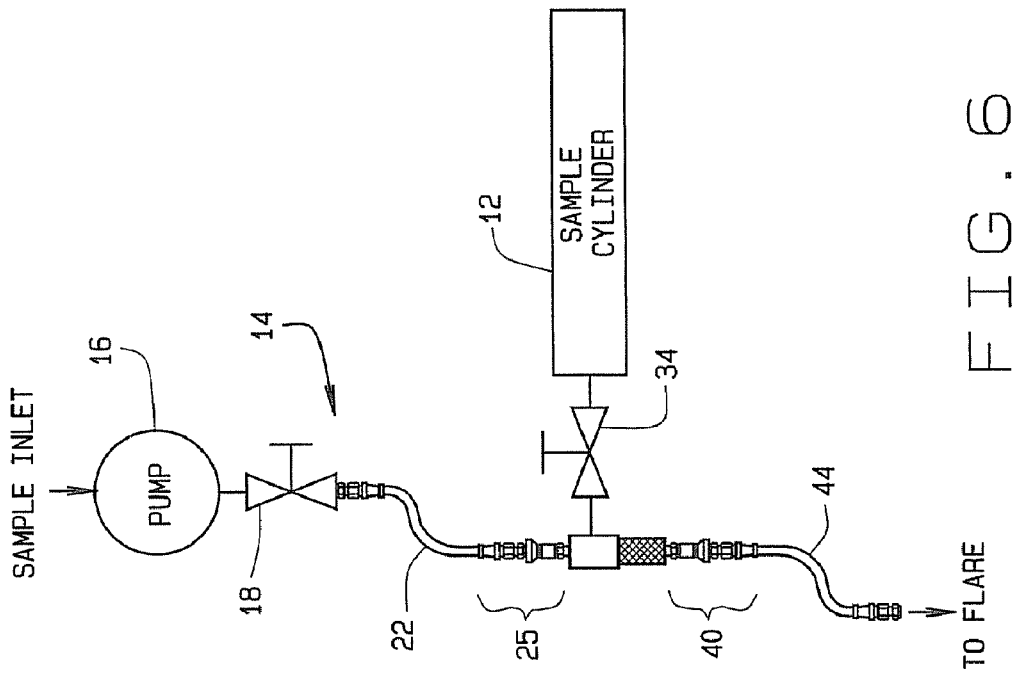
FIG. 6 is a schematic diagram of FIG. 3 with the addition of flow arrows to indicate the flow path of pressurized fluid being bled from the quick-connect and related piping to a flare. In this Figure, the bleeder valve is in the open position.

FIG. 6 is the schematic diagram of FIG. 3 with the addition of flow arrows to indicate the flow path of pressurized fluid bled from the quick-connects 25 and 40 and directed to a flare or other suitable point of disposal, not shown. In order to remove the sample cylinder 12 from the piping system 14, the shut off valves 18 and 34 must first be closed. This isolates pressurized fluid in the flexible hose 22, the quick connect 25 and the bleeder valve 30. To bleed this pressure down to acceptable lower levels, the bleeder valve 30 is opened, allowing the pressurized fluid to pass from the flexible hose 22, through the bleeder valve 30 and through the flexible hose 44 to a flare, not shown. An optional feature is a pressure gage installed in the system to measure the pressure of the fluid as it is being vented.

FIG. 7 is a section view of the bleeder valve 30 of FIG. 5 in the closed position with flow arrows to indicate fluid flow from the pump, not shown, to the sample cylinder, not shown. The bleeder valve 30 includes a rotatable valve element 50 and a valve body 52. The rotatable valve element 50 has a shoulder 56 which narrows to a partially threaded neck 58. The valve body 52 defines the inlet 28 and the outlet 32; the rotatable valve element defines the vent 36. A threaded vent port 60 in the valve body is sized to threadably engage the partially threaded neck 58. A chamfer 62 is formed on the end of the threaded vent port in the valve body. A large o-ring 64 fits over the partially threaded neck and is retained in a large o-ring channel 66 which is unthreaded and seals against the chamfer.

A tongue 68 protrudes from the end of the neck and is surrounded by a lip 70. A small o-ring channel 72 is formed between the tongue 68 and the lip 70. A small o-ring 76 is sized to fit in the small o-ring channel. A valve seat 78 is formed in the valve body and engages the small o-ring 76 when the valve is in the closed position, as shown in this figure. The large o-ring is under compression in both the closed position of this figure and the open position shown in the next figure.

FIG. 8 is a section view of the bleeder valve of FIG. 6 in the open position with flow arrows to indicate fluid flow from the pressurized quick-connect and related piping to the flare. In order to open the bleeder valve 30 the rotatable valve element is rotated counter-clockwise as shown in the next figure which relaxes the small o-ring 76. Note the large o-ring 64 is still compressed when the valve is in the open position of this figure.

When the small o-ring 76 is relaxed, it lifts and disengages from the valve seat 78. This allows pressurized fluid to flow from the pressurized piping system and the quick-connect 25, through the bleeder valve 30, as shown by the flow arrows to the flare or other point of disposal. This takes the hazardous fluid away from the operator and the quick-connects 25 and 40. The flow path through the bleeder valve 30 is as follows. The pressurized fluid flows through the inlet 28 in the valve body, through a vent passageway 80 in the valve body, across the small o-ring 76 and the lip 70. The pressurized fluid then passes into a vent tube 82 formed in the neck 58 because there is a seal formed by the compressed large o-ring 64 which is captured between the chamfer 62, the neck and the shoulder 56. The pressurized fluid passes from the vent tube 82 to the axial bore 83 to the vent 36 in the rotatable valve element. From the vent 36, the pressurized fluid flows through the flexible tubing 44 to the flare, not shown or other suitable point of disposal. This isolates the hazardous fluid and keeps it away from the operator. A bleeder valve intended for use in environments with hydrogen sulfide needs to be made of materials that resist this corrosive agent. For example the bleeder valve could be formed from Inconel® alloy and the o-ring seals could be formed from Kalrez® polymer, both of which are more expensive than 316 stainless steel and Buna-n polymer. However, even with the bleeder valve 30 being formed from Inconel® and Kalrez®, it will still be less expensive than a two-way ball valve with similar materials, or multiple valves and fittings which is why the present invention is different from the prior art.

It is important to size the small o-ring 76 and the large o-ring 64 in proper relationship to each other. The small o-ring must disengage from the valve seat when the valve is opened and simultaneously, the large o-ring must remain in compression forming a seal between the valve body and the rotatable valve element. When the valve is closed both the small and the large o-rings should be in compression. Applicants have found that a size −004 for the small o-ring and a −108 for the large o-ring are suitable for this invention. The width on the −004 is nominally 2/32 inch and the width on the −108 is nominally 3/32 inch. In other words the difference in the width between the small o-ring and the large o-ring is nominally 1/32 inch. This small difference allows the bleeder valve to operate properly when the valve element 50 is rotated from $1/8^{th}$ of a turn to a little less than one full revolution as better seen in FIGS. 10 and 12. The size of the o-rings will vary with the size of the bleeder valve 30. O-rings of larger and smaller sizes fall within the scope of this invention, provided that the size relationship between these two seals allows them function as described herein.

FIG. 9 is a section view of the bleeder valve taken 90 degrees from the angle of FIG. 7. In FIG. 9 and FIG. 7 the bleeder valve is in the closed position. Pressurized fluid flows from the inlet 28 through the valve body 52 to the outlet 32 and into the sample cylinder, not shown. The small o-ring 76 is compressed and is in engagement with the valve seat 78, blocking the flow of fluid to the vent 36. The large o-ring is also in compression forming a seal between the valve body 52 and the rotatable valve element 50. A stop pin 84 is seated in a hole 86 in the valve body.

FIG. 10 is a section view along the line 10—10 of FIG. 9. The stop pin 84 is abutted against a stop shoulder 88 formed in the rotatable valve element 50. The axial bore 83 is in the center of the rotatable valve element 50. In FIG. 10 the bleeder valve is closed. To open the bleeder valve, the rotatable valve element is twisted clockwise as shown by the arrow in this figure. The bleeder valve is shown in the open position in the next figure.

FIG. 11 is a section view of the bleeder valve 30 taken 90 degrees from the angle of FIG. 8. In FIGS. 11 and 12, the bleeder valve is in the open position. In FIG. 11, the small o-ring 76 is relaxed and the large o-ring 64 is compressed which forms a seal between the valve body 52 and the rotatable valve element 50. As previously discussed, the flow path of the pressurized fluid is as follows. The pressurized fluid flows through the inlet 28 in the valve body, through a vent passageway 80 in the valve body, across the small o-ring 76 and the lip 70. The pressurized fluid then passes into a vent tube 82 formed in the neck 58. The large o-ring 64 is compressed and forms a seal between the chamfer 62, the neck and the shoulder 56. The pressurized fluid passes from the vent tube 82 to the axial bore 83 and then to the vent 36 in the rotatable valve element 50. From the vent 36, the pressurized fluid flows through the flexible tubing 44 to the flare, not shown or other suitable point of disposal. This system isolates the hazardous fluid and keeps it away from the operator when the bleeder valve is opened and the sample cylinder is switched out.

FIG. 12 is a section view along the line 12—12 of FIG. 11. The stop pin 84 is abutted against a stop shoulder 88 formed in the rotatable valve element 50. In FIG. 12 the bleeder valve is open. To close the bleeder valve, the rotatable valve element is twisted counter-clockwise as shown by the arrow in this figure. The axial bore 83 is in the center of the rotatable valve element 50.

What is claimed is:

1. A valve comprising:
   a rotatable valve element threadably engaging a valve body;
   the valve body defining a central passageway in fluid connection with an inlet, an outlet and a vent, and further defining a valve seat;
   the rotatable valve element having:
   a shoulder and a partially threaded neck extending from the valve element to threadably engage the valve body, the un-threaded portion of the neck forming a large o-ring channel;
   the neck forming a lip and a protruding tongue with a small o-ring channel form between the lip and the tongue;
   a large o-ring sized to fit in the large o-ring channel and a small o-ring sized to fit in the small o-ring channel, the large o-ring having a width greater than the small o-ring;
   a vent passageway in fluid communication with a inlet vent positioned in the neck between the lip and the large o-ring and an outlet vent opposite the neck;
   the small o-ring being in contact with the valve seat when the valve is closed, allowing fluid to flow from the valve inlet, through the central passageway to the valve outlet; and
   the small o-ring being out of contact with the valve seat when the valve is opened allowing fluid to flow from the valve inlet, through the central passageway, to the valve vent, across the small o-ring and into the inlet vent, the vent passageway and out the outlet vent.

2. The apparatus of claim 1 further including a stop pin positioned in the valve body and extending towards the rotatable valve element to prevent the rotatable valve element from unintentionally disengaging from the valve body.

3. The apparatus of claim 2 wherein both the small o-ring and the large o-ring are formed from a material that is resistant to hazardous materials.

4. The apparatus of claim 3 wherein the valve element and the valve body are formed from a material that is resistant to hazardous materials.

5. A pressure reduction system for quick-connects comprising:
   a first and a second quick-connect and a valve;
   the valve comprising:
   a rotatable valve element threadably engaging a valve body;
   the valve body defining a central passageway in fluid connection with an inlet, an outlet and a vent, and further defining a valve seat;
   the rotatable valve element having:
   a shoulder and a partially threaded neck extending from the valve element to threadably engage the valve body, the un-threaded portion of the neck forming a large o-ring channel;
   the neck forming a lip and a protruding tongue with a small o-ring channel formed between the lip and the tongue;
   a large o-ring sized to fit in the large o-ring channel and a small o-ring sized to fit in the small o-ring channel, the large o-ring having a width greater than the small o-ring; and
   a vent passageway in fluid communication with a inlet vent positioned in the neck between the lip and the large o-ring and an outlet vent opposite the neck;
   the small o-ring being in contact with the valve seat when the valve is closed, allowing fluid to flow from the valve inlet, through the central passageway to the valve outlet; and
   the small o-ring being out of contact with the valve seat when the valve is opened, allowing fluid to flow from the valve inlet, through the central passageway, to the valve vent, across the small o-ring and into the inlet vent, the vent passageway and out the outlet vent;
   the first quick-connect removably attached to the valve and in fluid communication with the valve inlet; and
   the second quick-connect removably attached to the valve and in fluid communication with the vent, so the valve can be disconnected and removed from a portion of the first quick-connect and a portion of the second quick-connect.

6. A pressure reduction system for a quick-connect comprising:
   a quick-connect and a valve;
   the valve comprising:
   a rotatable valve element threadably engaging a valve body;
   the valve body defining a central passageway in fluid connection with an inlet, an outlet and a vent, and further defining a valve seat;
   the rotatable valve element having:
   a shoulder and a partially threaded neck extending from the valve element to threadably engage the valve body, the un-threaded portion of the neck forming a large o-ring channel;
   the neck forming a lip and a protruding tongue with a small o-ring channel formed between the lip and the tongue;
   a large o-ring sized to fit in the large o-ring channel and a small o-ring sized to fit in the small o-ring channel, the large o-ring having a width greater than the small o-ring; and
   a vent passageway in fluid communication with a inlet vent positioned in the neck between the lip and the large o-ring and an outlet vent opposite the neck;
   the small o-ring being in contact with the valve seat when the valve is closed, allowing fluid to flow from the valve inlet, through the central passageway to the valve outlet;
   the small o-ring being out of contact with the valve seat when the valve is opened, allowing fluid to flow from the valve inlet, through the central passageway, to the valve vent, across the small o-ring and into the inlet vent, the vent passageway and out the outlet vent; and
   the quick-connect removably attached to the valve outlet and in fluid communication with the valve outlet.

* * * * *